(12) United States Patent
Akiyama et al.

(10) Patent No.: US 10,656,054 B2
(45) Date of Patent: May 19, 2020

(54) TIRE TESTING APPARATUS

(71) Applicant: Nissan North America, Inc., Franklin, TN (US)

(72) Inventors: Donald Akiyama, Mesa, AZ (US); John Hsu, Phoenix, AZ (US); Robert Tyree, Maricopa, AZ (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/875,292

(22) Filed: Jan. 19, 2018

(65) Prior Publication Data
US 2019/0226945 A1   Jul. 25, 2019

(51) Int. Cl.
| | | |
|---|---|---|
| *G01N 3/08* | (2006.01) | |
| *G01M 17/02* | (2006.01) | |
| *G01N 3/18* | (2006.01) | |
| *G01N 3/10* | (2006.01) | |

(52) U.S. Cl.
CPC .......... *G01M 17/021* (2013.01); *G01N 3/10* (2013.01); *G01N 3/18* (2013.01)

(58) Field of Classification Search
CPC .......... G01M 17/021; G01N 3/10; G01N 3/18
See application file for complete search history.

(56) References Cited

U.S. PATENT DOCUMENTS

| | | | | |
|---|---|---|---|---|
| 5,773,717 | A  * | 6/1998 | Reinhardt ............... | G01N 3/24 |
| | | | | 73/146 |
| 6,269,688 | B1 * | 8/2001 | Kroll ..................... | G01M 17/02 |
| | | | | 73/146 |
| 6,439,043 | B1 * | 8/2002 | Ferris .................... | G01M 17/02 |
| | | | | 73/146 |
| 2018/0120188 | A1 * | 5/2018 | Clasquin ............... | G01M 1/225 |
| 2018/0128704 | A1 * | 5/2018 | Farelli ................... | G01M 1/045 |

* cited by examiner

*Primary Examiner* — Jamel E Williams
(74) *Attorney, Agent, or Firm* — Global IP Counselors, LLP (57) ABSTRACT

A tire testing apparatus includes a tire supporting structure, a force applying device, a force measuring device and a controller. The tire supporting structure is configured to retain a tire. The force applying device is attached to the tire supporting structure and is configured to selectively apply a static force to the tire with the tire retained by the tire supporting structure. The force measuring device is attached to the tire supporting structure and is configured to measure the static force applied to the tire applied by the force applying device. The controller is electronically connected to the force applying device and the force measuring device. The controller is configured to receive force measurements from the force measuring device and selectively operate the force applying device to apply a predetermined level of static force to the tire for a predetermined period of time.

19 Claims, 5 Drawing Sheets

TIRE TESTING APPARATUS

BACKGROUND

Field of the Invention

The present invention generally relates to a tire testing apparatus. More specifically, the present invention relates to tire testing apparatus configured to test long term effects of static forces applied to the tire.

Background Information

Vehicles are sometimes stored in open areas that are subjected to extreme changes in weather.

SUMMARY

One object of the disclosure is to provide a tire testing apparatus with features that simulate long term storage of a vehicle and the effects of long term storage on vehicle tires.

In view of the state of the known technology, one aspect of the present disclosure is to provide a tire testing apparatus with a tire supporting structure, a force applying device, a force measuring device and a controller. The tire supporting structure is configured to retain a tire. The force applying device is attached to the tire supporting structure and is configured to selectively apply a static force to the tire with the tire retained by the tire supporting structure. The force measuring device is attached to the tire supporting structure configured to measure the static force applied to the tire applied by the force applying device. The controller is electronically connected to the force applying device and the force measuring device. The controller is configured to receive force measurements from the force measuring device and selectively operate the force applying device to apply a predetermined level of static force to the tire for a predetermined period of time.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
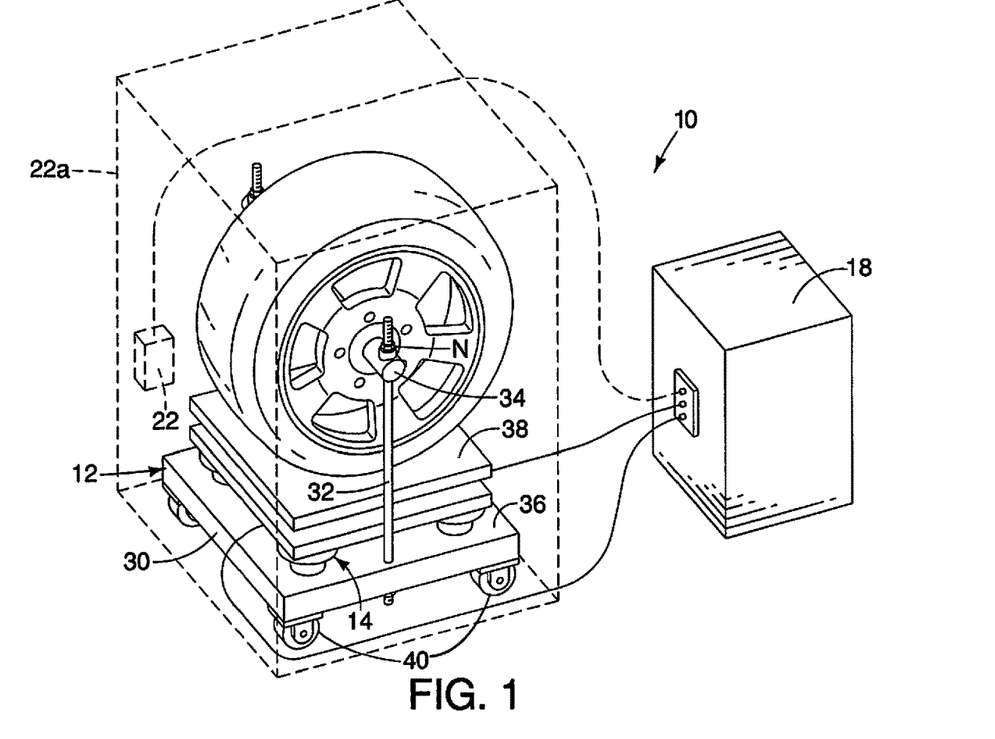
FIG. 1 is a perspective view of a tire testing apparatus that includes a tire supporting structure in accordance with a first embodiment.

Referring initially to FIG. 1, a tire testing apparatus 10 is illustrated in accordance with a first embodiment. The tire testing apparatus 10 is configured and arranged to support and retain a tire T thereon. The tire testing apparatus 10 is further configured to subject a tire to prolonged static forces in order to simulate certain environmental circumstances vehicle tires experience during their useful lifetime.

The tire testing apparatus 10 includes a tire support structure 12, a force applying device 14, a force measuring device 16 and a controller 18. The tire testing apparatus 10 can also optionally include, for example, a tire pressure monitoring device 20 and/or a heating apparatus 22.

As shown in FIGS. 1-4, the tire support structure 12 includes a base 30, a pair of upright beams 32, an axle 34 extending between the upright beams 32, an intermediate plate 36 and a tire supporting plate 38.

The base 30 is a metallic plate-like member that is dimensioned to be stable and rigid. The base 30 can optionally include casters 40 (or wheels 40) to make it easy to move the tire support structure 12. The pair of upright beams 32 have lower ends that are rigidly and non-movably fixed to the base 30. For example, lower ends of the upright beams 32 can include mechanical threads that engage threads (not shown) formed in apertures (not shown) in the base 30. It should be understood that the upright beams 32 can alternatively be welded or otherwise rigidly fixed to the base 30 by other mechanical fastening arrangements.

The pair of upright beams 32 are preferably rigid metal rods that extend upward from the base 30. The upright beams 32 are dimensioned to withstand forces generated by the force applying device 14 and applied to the tire T, as described further below. Upper ends of each of the upright beams 32 are provided with mechanical threads.

The axle 34 is removably installed to upper ends of the upright beams 32 and extends between the upright beams 32. Opposite ends of the axle 34 are provided with openings that receive respective ones of the upright beams 32. Threaded nuts N are installed to the machine threads at the upper ends of the upright beams 32 and are configured to retain the axle 34 to the upright beams 32. The tire T is installed to the axle 34 such that the tire T is held in position by the axle 34 such that the tire T rests on the tire supporting plate 38 between the upright beams 32. The axle 34 is also preferably a rigid metal rod dimensioned to withstand forces generated by the force applying device 14 as applied to the tire T, as described further below.

The intermediate plate 36 and the tire supporting plate 38 are preferably rigid, flat metal plates that are positioned above the base 30 and between the upright beams 32 in a manner described further below.

Figure 2:
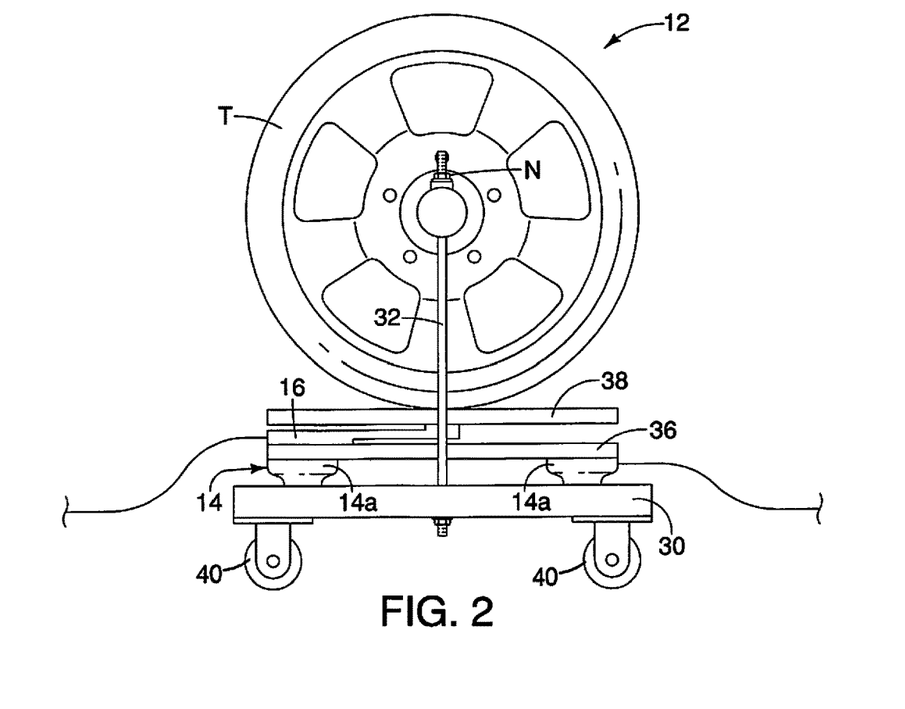
FIG. 2 is a first side view of the tire testing apparatus showing details of the tire supporting structure which includes a base, an intermediate plate, a tire supporting plate, a force applying device positioned between the base and the intermediate plate, and a force measuring device between the intermediate plate and the tire supporting plate in accordance with the first embodiment.
Figure 3:
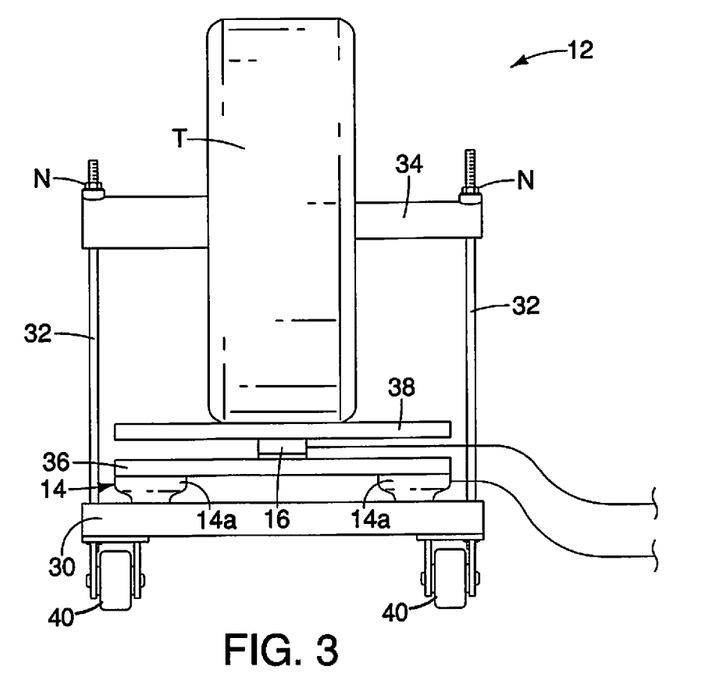
FIG. 3 is a front view of the tire testing apparatus showing the base, the intermediate plate, the tire supporting plate, the force applying device and the force measuring device of the tire supporting structure in accordance with the first embodiment.
Figure 4:
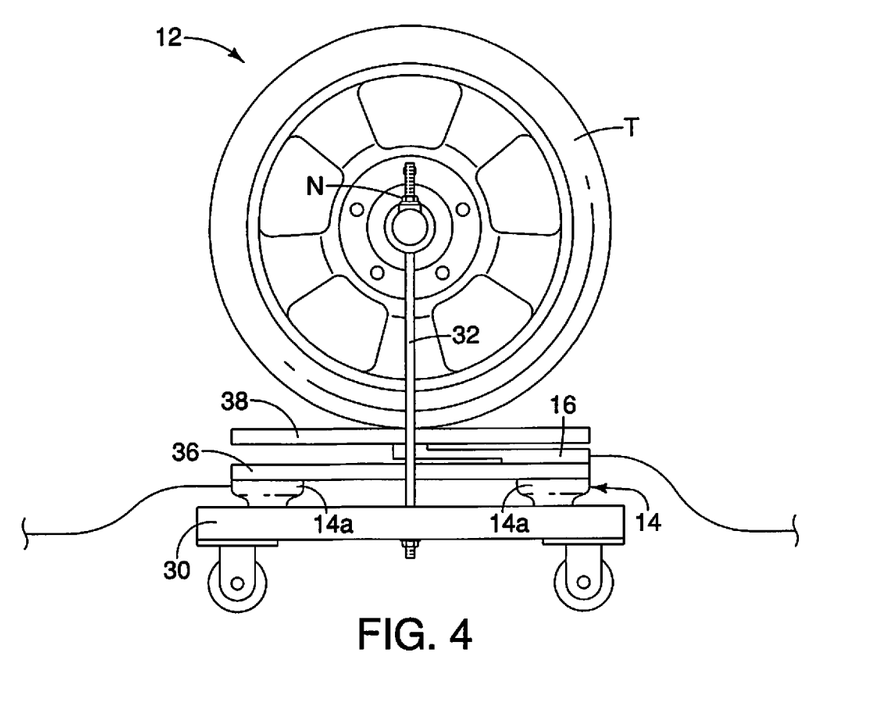
FIG. 4 is a second side view of the tire testing apparatus showing the base, the intermediate plate, the tire supporting plate, the force applying device and the force measuring device of the tire supporting structure in accordance with the first embodiment.

The force applying device 14 is located on an upper surface of the base 30 and below the intermediate plate 36. In other words, the force applying device 14 is located between the base 30 and the intermediate plate 36. Further, a lower portion of the force applying device 14 is attached to the base 30 by, for example, mechanical fasteners (not shown) or by an adhesive material (not shown). Alternatively, the force applying device 14 can merely rest on the base 30 and be held in place by the weight of the intermediate plate 36 and the tire supporting plate 38.

Figure 5:
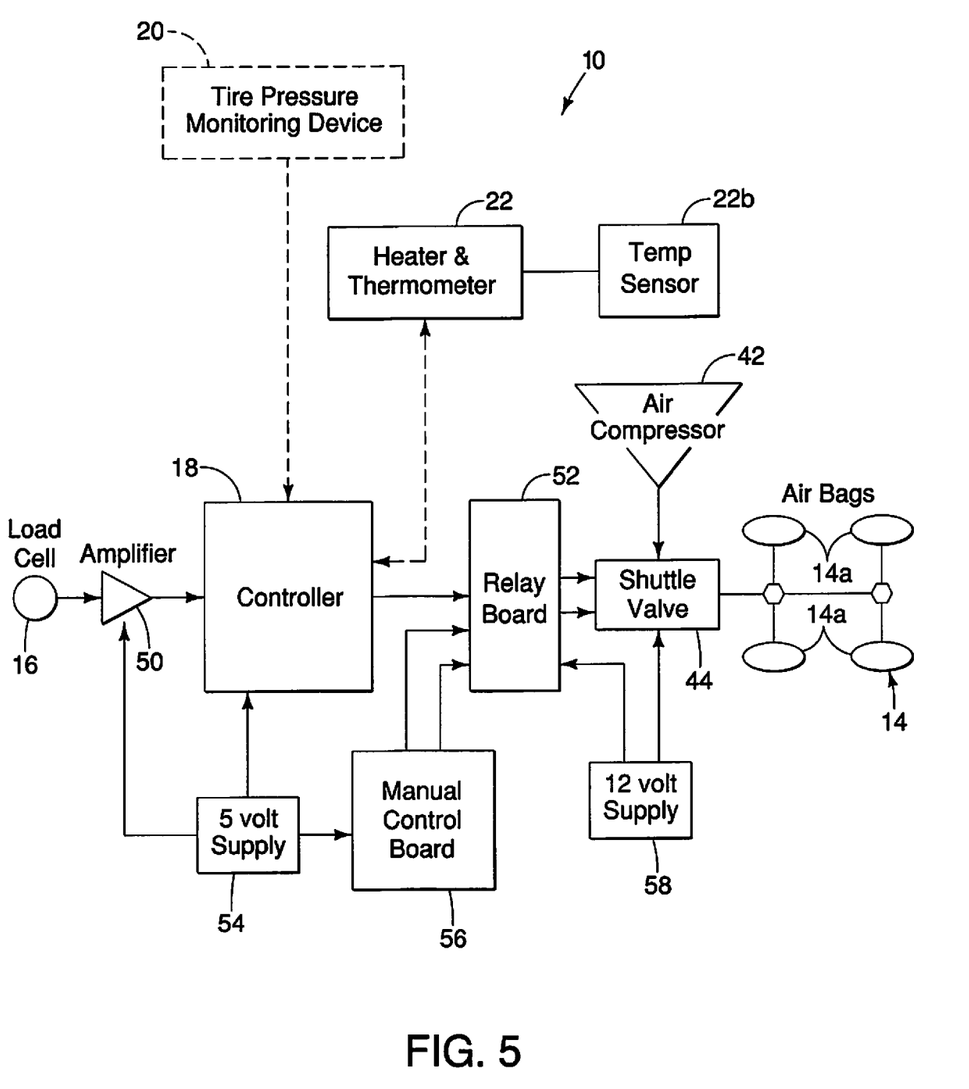
FIG. 5 is a schematic diagram showing an electronic controller connected to each of the force applying device, the force measuring device, a heating apparatus and a tire pressure monitoring device in accordance with the first embodiment.

The force applying device 14 is configured to selectively apply a static force to the tire T with the tire T retained by the tire supporting structure 12. The force applying device 14 includes a plurality of inflatable pneumatic bladders 14a that are connected to an air compressor 42 (FIG. 5). As indicated in FIGS. 2, 3 and 4, there are four pneumatic bladders 14a installed between the base 30 and the intermediate plate 36. As shown in FIG. 5, all four of the pneumatic bladders 14a are connected to the air compressor 42.

As is described in greater detail below, the controller 18 controls operation of the air compressor 42 and a shuttle valve 44 in order to apply and maintain a predetermined force applied by the inflatable pneumatic bladders 14a to the tire T.

It should be understood from the drawings and the description herein that the force applying device 14 can alternatively be a hydraulically activated device that operates in a manner similar to the pneumatic bladders 14a, but with force being applied hydraulically instead of pneumatically.

The force measuring device 16 (a load cell) is located between the intermediate plate 36 and the tire supporting plate 38. The force measuring device 16 includes a conventional cantilevered member with, for example, strain gauges attached thereto. A lower surface of the force measuring device 16 is rigidly fixed to the intermediate plate 36, and an upper surface of the cantilevered member is rigidly fixed to the tire supporting plate 38. Hence, the force measuring device 16 is located between the tire T and the force applying device 14 and therefore experiences and accurately measures the total force being applied to the tire T.

The tire pressure monitoring device 20 (FIG. 5) is an optional feature that includes a pressure sensor (not shown) that can be located within the tire T and/or be part of a valve stem assembly (not shown) of the tire T. The pressure sensor wirelessly communicates tire pressure monitoring device 20.

The heating apparatus 22 is a heating device that can be provided optional features, as shown in FIGS. 1 and 5. As shown in FIG. 1, a thermally insulated enclosure 22a can be provided with the heating apparatus 22 in order to achieve and maintain constant temperature around the tire T, if needed or desired for conducting tests on the tire T. Specifically, the tire support structure 12 and the tire T can be secluded, isolated or sealed within the thermally insulated enclosure 22a in order to control temperature of the tire T during testing. Alternatively, the heating apparatus 22 can be a stand-alone heating device that provides heat to the tire merely by being positioned near the tire T. Still further, the heating apparatus 22 can include a fan (not shown) such that the heating apparatus 22 blows heated air against on or more sides of the tire T. As shown in FIG. 5, the heating apparatus 22 can also include a temperature sensor 22b that measures heat proximate the heating device and/or the tire T, or within the thermally insulated enclosure 22a.

As shown in FIG. 5, the controller 18 is an electronic device that is connected to the force applying device 14 (pneumatic bladders 14a) via the shuttle valve 44 and a relay board 52, the force measuring device 16 (load cell 16) via an amplifier 50 and a 5 volt supply 54, the tire pressure monitoring device 20, the heating apparatus 22 and a manual control board 56 (a test parameter input device).

The controller 18 preferably includes a microcomputer with a testing control program that controls the various devices attached thereto (as mentioned above). The controller 18 can also include other conventional components such as an input interface circuit, an output interface circuit, and storage devices such as a ROM (Read Only Memory) device and a RAM (Random Access Memory) device. The microcomputer of the controller 18 is programmed to control the tire testing apparatus 10. The memory circuit stores processing results and control programs such as ones for tire testing operations that are run by the processor circuit. The controller 18 is operatively coupled to the force applying device 14, the force measuring device 16, the tire pressure monitoring device 20, the heating apparatus 22 and the manual control board 56 in a conventional manner. The internal RAM of the controller 18 stores statuses of operational flags and various control data. The internal ROM of the controller 18 stores the communication protocols for communicating and operating the attached devices for various operations. The controller 18 is capable of selectively controlling any of the components of the tire testing apparatus 10 in accordance with the control program. It will be apparent to those skilled in the art from this disclosure that the precise structure and algorithms for the controller 18 can be any combination of hardware and software that will carry out the functions of the present invention.

As is also shown in FIG. 5, the air compressor 42 is connected to the shuttle valve 44, the shuttle valve 44 can be provided with a 12 volt power supply 58 that also provides power to the relay board 52.

The controller 18 is configured to operate the force applying device 14 to apply static force to the tire T that is between 100 pounds and 2000 pounds. In some tests, the static force applied to the tire T is between 800-1000 pounds or can be further limited to force levels between 925 pounds and 975 pounds. Additionally, during a test, the controller 18 can change the load applied to the tire T. For example, during a test, the static force can start at a first level of force, then be changed to a differing level of force.

During testing of the tire T with the controller 18 controlling the force applying device 16, the force measuring device 16 which is connected to the controller 18, provides force measurements to the controller 18. The controller 18 can be set to selectively operate the force applying device 14 to apply the predetermined level of static force to the tire T for a predetermined period of time that can be from, for example, between two and ten days, or between three and five days.

Parameters for tests conducted using the tire testing apparatus 10 are inputted via the manual control board 56. The manual control board 56 can include, for example, a touch screen display (not shown) or a display with a keyboard (not shown). Hence the manual control board 56 can be used to set test parameters that are then sent to the controller 18 and stored in memory by the controller 18. The controller 18 can thereafter conduct tests in accordance with the inputted test parameters.

The controller 18 is further configured to record changes in static force acting on the tire T over time as measured by the force measuring device 16.

Optionally, the controller 18 can be configured to operate the heating apparatus 22 to change temperature of the tire T or around the tire T, in order to simulate outdoor temperature changes associated with day and night conditions. The controller 18 is further configured to record detected changes in temperature of the tire T and/or the area around the tire T over time as measured by the temperature sensor 22b, and simultaneously record changes in temperature along with static force acting on the tire T measured by the force measuring device 16.

The controller 18 is receives temperature measurements from the temperature sensor 22b and operates the heating apparatus to apply heat the tire T or the area around the tire T to achieve a predetermined temperature while the controller 18 operates the force applying device 14 to apply the predetermined level of static force to the tire T.

In some test parameters, the controller 18 controls the heating apparatus 22 to heat the tire T to a predetermined temperature where the predetermined temperature is between 120-170 degrees F.

As shown in FIG. 5, the controller 18 can optionally be connected to the tire pressure monitoring device 20. The controller 18 is further configured to operate the force applying device 14 in order to compensate for changes in tire pressure within the tire T thereby maintaining the predetermined level of static force to the tire.

Further, the controller 18 is configured to record changes in air pressure within the tire T over time measured by the tire pressure monitoring device 20, and simultaneously record changes in static force acting on the tire T as measured by the force measuring device 16.

Figure 6:
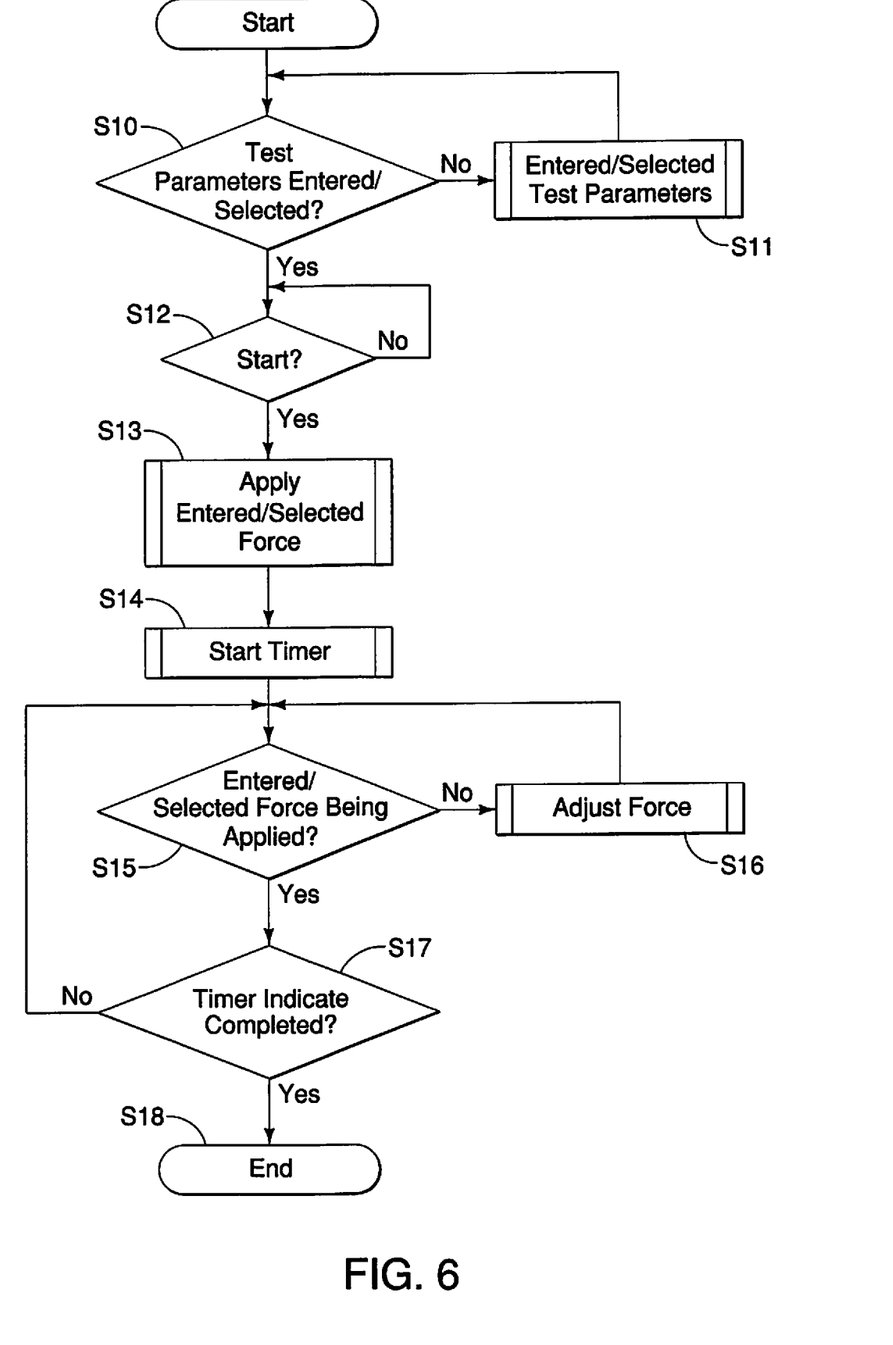
FIG. 6 is a flowchart showing basic operational steps conducted by the electronic controller in accordance with the first embodiment.

FIG. 6 is a flowchart that shows one example of logic used by the controller 18 during a test of the tire T. Once started, at step S10, the controller 18 checks to see of test parameters have been entered via the manual control board 56, or received test parameters from memory. If not, at step S11, test parameters, such as the force to be applied to the tire T via the force applying device 14 and the duration of the test (i.e., number of hours or days test is to be conducted) are entered via the manual control board 56 or selected from memory via the manual control board 56. If at step S10 test parameters have been entered or selected, operation moves to step S12.

At step S12, the controller 18 checks to see if the test is ready to start, based on input or timing information entered via the manual control board 56. If not, the controller 18 goes to a standby mode, waiting for start instructions to be entered. If so, operation moves to step S13.

At step S13, the controller 18 operates the force applying device 14 by opening the shuttle valve 44 to allow compressed air from the air compressor 42 to inflate the pneumatic bladders 14a to achieve a target level of force (an entered parameter). At step S14, the controller 18 begins tracking the passage of time.

At step S15, the controller 18 checks the force measurements received from the force measuring device 16. If the target or predetermined level of force applied by the pneumatic bladders 14a has not achieved the predetermined level of force, the controller 18 operates the shuttle valve 44 at step S16 to adjust (increase or decrease) the force being applied by the pneumatic bladders 14a in order to achieve the predetermined level of force. If the predetermined level of force is being applied, the controller 18 moves from step S15 to step S17.

At step S17, the controller 18 determines whether or not the predetermined period of time as elapsed. If the time period is not completed, operation returns to step S15. If the time period is completed (the test is completed), the controller 18 releases the air pressure within the pneumatic bladders 14a, thereby eliminating the force applied to the tire T, and ends operation at step S18.

In the logic presented in FIG. 6, the controller 18 does not operate the heating apparatus 22. Heat can be manually applied to the tire T by an operator either by providing heat to areas around the tire T or by placing the tire supporting structure 12 inside the thermally insulated enclosure 22a and heat applying heat therein.

Using the tire testing apparatus 10 as described above, it is possible to conduct static tests on the tire T. Such tests can include experiments that simulate the effects of long term static storage of a vehicle that includes the tire T.

Second Embodiment

Figure 7:
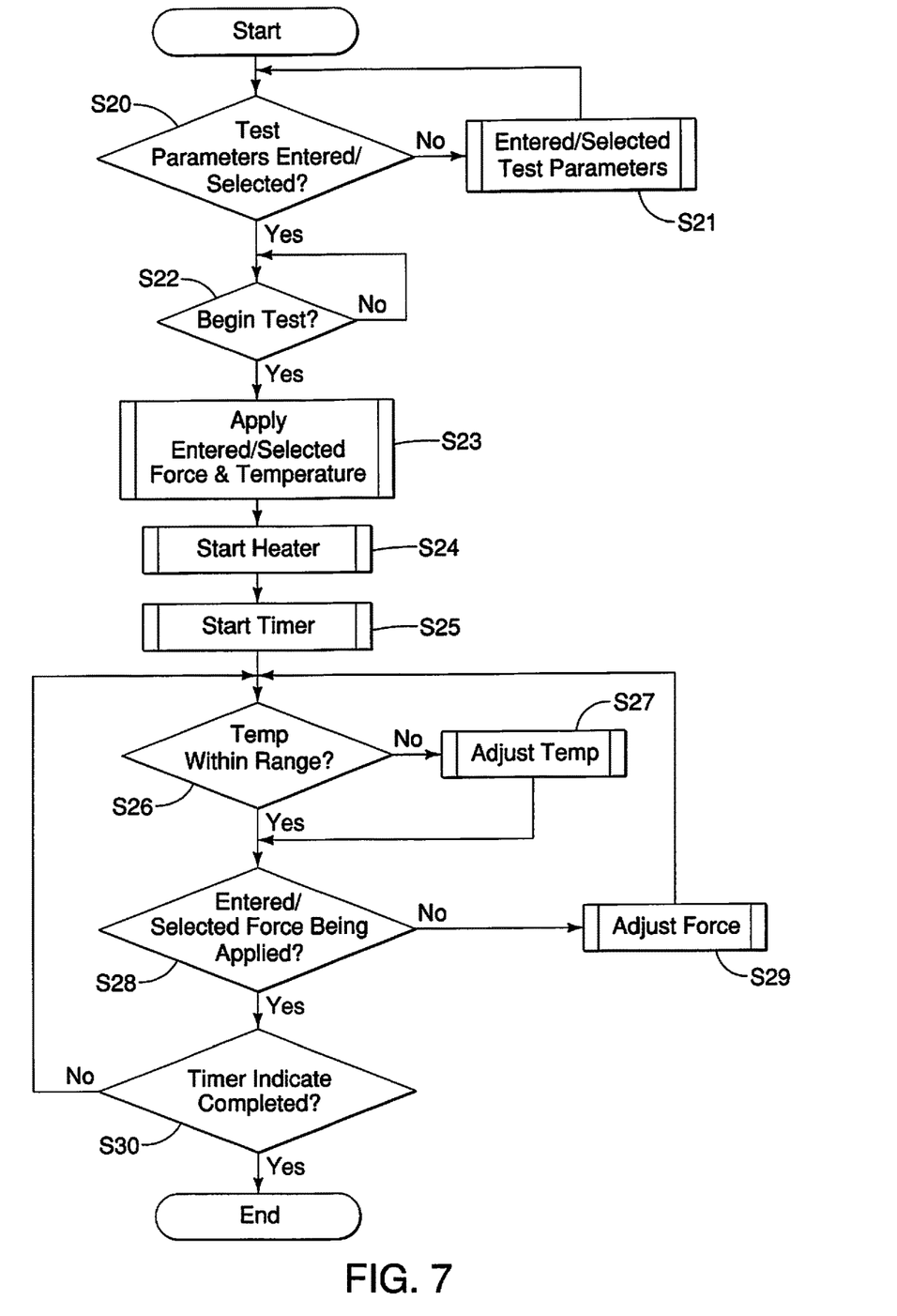
FIG. 7 is another flowchart showing basic operational steps conducted by the electronic controller in accordance with a second embodiment.

Referring now to FIG. 7, a modified flowchart in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The tire testing apparatus 10 of the second embodiment is identical to that of the first embodiment. However, in the logic presented in FIG. 7, the controller 18 additionally operates the optional heating apparatus 22.

FIG. 7 is a flowchart that shows another example of logic used by the controller 18 during a test of the tire T. Once started at step S20, the controller 18 checks to see of test parameters have been entered via the manual control board 56, or received test parameters from memory. If not, at step S21, test parameters, such as the force to be applied to the tire T via the force applying device 14, the duration of the test (i.e., number of hours or days test is to be conducted) and temperature within the thermally insulated enclosure 22a, or around the tire T, are entered via the manual control board 56 or selected from memory via the manual control board 56. If at step S20 test parameters have been entered or selected, operation moves to step S22.

At step S22, the controller 18 checks to see if the test is ready to start, based on input or timing information entered via the manual control board 56. If not, the controller 18 goes to a standby mode, waiting for start instructions to be entered. If so, operation moves to step S23.

At step S23, the controller 18 operates the force applying device 14 by opening the shuttle valve 44 to allow compressed air from the air compressor 42 to inflate the pneumatic bladders 14a to achieve a target level of force (an entered parameter).

At step S24, the controller 18 begins operating the heating apparatus 22 to achieve the target temperature either within the thermally insulated enclosure 22a or by applying heat around or to the tire T.

At step S25, the controller 18 begins tracking the passage of time.

At step S26, the controller checks the measurements made by the temperature sensor 22b to see if the target temperature has been achieved. If not, operation moves to step S27 where the temperature is adjusted to the target temperature.

Next at step S28, the controller 18 checks the force measurements received from the force measuring device 16. If the target or predetermined level of force applied by the pneumatic bladders 14a has not achieved the predetermined level of force, the controller 18 operates the shuttle valve 44 at step S29 to adjust (increase or decrease) the force being applied by the pneumatic bladders 14a in order to achieve the predetermined level of force. From step S29, operation returns to step S26. If the predetermined level of force is determined to be correct at step S28, the controller 18 moves from step S28 to step S30.

At step S30, the controller 18 determines whether or not the predetermined period of time as elapsed. If the time period is not completed, operation returns to step S26. If the time period is completed (the test is completed), the controller 18 releases the air pressure within the pneumatic bladders 14a thereby eliminating the force applied to the tire T, turns off the heating apparatus 22 (ceases applying heat), and ends operation at step S18.

Using the above logic, it is also possible to vary the temperature within the thermally insulated enclosure 22a or around the tire T if the thermally insulated enclosure 22a is not present, in order to simulate temperature changes around a vehicle and the tire T during long term storage. Specifically, at predetermined time intervals, the controller 18 can change the target temperature from a first temperature to a second temperature where one of the first temperature and the second temperature represents a hot sunny environment and the other of the first temperature and the second temperature represents cooler, evening and night time weather. Thus, the force applied to the tire T remains constant and the temperature of the tire T or around the tire T varies over time.

It will be apparent to those skilled in the art from this disclosure that the components of the invention can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the tire testing apparatus 10. Accordingly, these terms, as utilized to describe the present invention should be interpreted relative to a vehicle equipped with the tire testing apparatus 10.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A tire testing apparatus, comprising
    a tire supporting structure configured to retain a tire, the tire supporting structure including a base with a pair of upright beams and an axle extending between the pair of upright beams, with the tire being removably installed to the axle between the pair of upright beams;
    a force applying device attached to the tire supporting structure configured to selectively apply a static force to the tire with the tire retained by the tire supporting structure;
    a force measuring device attached to the tire supporting structure configured to measure the static force applied to the tire applied by the force applying device; and
    a controller electronically connected to the force applying device and the force measuring device, the controller receiving force measurements from the force measuring device and selectively operating the force applying device to apply a predetermined level of static force to the tire for a predetermined period of time.

2. The tire testing apparatus according to claim 1, wherein the tire supporting structure further includes a tire supporting plate and an intermediate plate, the tire resting on the tire supporting plate with the force applying device located between the base and the intermediate plate, and the force measuring device being located between the intermediate plate and the tire supporting plate.

3. The tire testing apparatus according to claim 2, wherein the force applying device includes a plurality of inflatable pneumatic bladders.

4. The tire testing apparatus according to claim 2, wherein the force measuring device includes a load cell.

5. The tire testing apparatus according to claim 1, wherein the controller is configured to operate the force applying device to apply static force that is between 800 pounds and 1000 pounds to the tire.

6. The tire testing apparatus according to claim 5, wherein the controller is further configured to operate the force applying device to apply static force that is between 925 pounds and 975 pounds to the tire.

7. The tire testing apparatus according to claim 1, wherein the period of time the controller is configured to operate the force applying device to apply the predetermined level of static force to the tire retained in the tire supporting structure is between two and ten days.

8. The tire testing apparatus according to claim 7, wherein the period of time the controller is configured to operate the force applying device to apply the predetermined level of static force to the tire retained in the tire supporting structure is between three and five days.

9. A tire testing apparatus comprising
a tire supporting structure configured to retain a tire;
a force applying device attached to the tire supporting structure configured to selectively apply a static force to the tire with the tire retained by the tire supporting structure;
a force measuring device attached to the tire supporting structure configured to measure the static force applied to the tire applied by the force applying device;
a controller electronically connected to the force applying device and the force measuring device, the controller receiving force measurements from the force measuring device and selectively operating the force applying device to apply apredetermined level of static force to the tire for a predetermined periodof time;
a heating apparatus electronically connected to the controller; and
a temperature sensor electronically connected to the controller.

10. The tire testing apparatus according to claim 9, wherein
the controller is configured receive temperature measurements from the temperature sensor and operate the heating apparatus to apply heat the tire to achieve a predetermined temperature with the controller operating the three applying device to apply the predetermined level of static force to the tire.

11. The tire testing apparatus according to claim 10, wherein
the controller is further configured to heat the tire to the predetermined temperature such that the tire is heated to a temperature of between 120-170 degrees F.

12. The tire testing apparatus according to claim 9, wherein
the heating apparatus includes a heating device and an insulated chamber with the tire supporting structure being, located within the insulated chamber.

13. The tire testing apparatus according to claim 9, wherein
the controller is configured to operate the heating apparatus to change temperature of the tire in order to simulate outdoor temperature changes associated with day and night conditions.

14. The tire testing apparatus according to claim 13, wherein
the controller is further configured to record changes in temperature of the tire over time measured by the temperature sensor, and simultaneously record changes in static force acting on the tire measured by the force measuring device.

15. A tire testing apparatus comprising
a tire supporting structure configured to retain a tire;
a force applying device attached to the tire supporting structure configured to selectively apply a static force to the tire with the tire retained by the tire supporting structure;
a force measuring device attached to the tire supporting structure configured to measure the static force applied to the tire applied by the force applying device;
a controller electronically connected to the force applying device and the force measuring device, the controller receiving force measurements from the force measuring device and selectively operating the force applying device to apply a predetermined level of static force to the tire for a predetermined period of time, the controller being further configured to operate the force applying device in order to compensate for changes in tire pressure within the tire thereby maintaining the predetermined level of static force to the tire; and
a tire pressure monitoring device connected to the tire to monitor air pressure within the tire, the tire pressure monitoring device being in electronic communication with the controller.

16. The tire testing apparatus according to claim 15, wherein
the controller is further configured to record changes in air pressure within the tire over time measured by the tire pressure monitoring device, and record changes in static force acting on the tire measured by the force measuring device.

17. The tire testing apparatus according to claim 1, wherein
the controller is further configured to record changes in static force acting on the tire over time as measured by the force measuring device.

18. The tire testing apparatus according to claim 9, wherein
the controller is further configured to record changes in static force acting on the tire over time as measured by the force measuring device.

19. The tire testing apparatus according to claim 15, wherein
the controller is further configured to record changes in static force acting on the tire over time as measured by the force measuring device.

* * * * *